United States Patent
King-Smith et al.

(10) Patent No.: US 11,157,061 B2
(45) Date of Patent: *Oct. 26, 2021

(54) PROCESSOR MANAGEMENT VIA THREAD STATUS

(71) Applicant: International Business Machines Corporation, Armonk, NY (US)

(72) Inventors: Bernard A. King-Smith, Lake Katrine, NY (US); Bret R. Olszewski, Austin, TX (US); Stephen Rees, Bowmanville (CA); Basu Vaidyanathan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 430 days.

This patent is subject to a terminal disclaimer.

(21) Appl. No.: 15/888,037

(22) Filed: Feb. 4, 2018

(65) Prior Publication Data

US 2018/0157304 A1 Jun. 7, 2018

Related U.S. Application Data (63) Continuation of application No. 15/150,193, filed on May 9, 2016, now Pat. No. 9,886,077, which is a continuation of application No. 13/069,338, filed on Mar. 22, 2011, now Pat. No. 9,354,926.

(51) Int. Cl.
*G06F 1/3228* (2019.01)
*G06F 9/48* (2006.01)
*G06F 1/3296* (2019.01)

(52) U.S. Cl.
CPC ......... *G06F 1/3228* (2013.01); *G06F 1/3296* (2013.01); *G06F 9/4843* (2013.01); *Y02B 70/10* (2013.01); *Y02D 10/00* (2018.01)

(58) Field of Classification Search
None
See application file for complete search history.

(56) References Cited

U.S. PATENT DOCUMENTS

| | | | |
|---|---|---|---|
| 6,931,641 B1 * | 8/2005 | Davis | G06F 9/3802 712/228 |
| 7,783,787 B1 | 8/2010 | DeBergalis et al. | |
| 7,802,255 B2 | 9/2010 | Pilkington | |
| 7,882,379 B2 | 2/2011 | Kanakogi | |
| 8,302,098 B2 | 10/2012 | Johnson et al. | |
| 2002/0115699 A1 | 8/2002 | Buckingham | |

(Continued)

FOREIGN PATENT DOCUMENTS

WO 2000039677 7/2000

*Primary Examiner* — Lewis A Bullock, Jr.
*Assistant Examiner* — Melissa A Headly
(74) *Attorney, Agent, or Firm* — Kelli D. Morin (57) ABSTRACT

A process for processor management includes activating a delay thread running on a processor. A determination is made whether a wait event for a first thread running on the processor is in a queue. Responsive to determining that the wait event for the first thread is in the queue, a determination is made whether a wait time associated with the wait event has expired. Responsive to determining that the wait time has not expired, a determination is made if wait time exceeds a threshold. Responsive to determining that the wait time exceeds the threshold, a timer is set and a low power mode is initiated for the processor.

17 Claims, 6 Drawing Sheets

(56) References Cited

U.S. PATENT DOCUMENTS

| | | |
|---|---|---|
| 2003/0018685 A1 | 1/2003 | Kalafatis et al. |
| 2006/0095908 A1 | 5/2006 | Norton et al. |
| 2006/0136919 A1 | 6/2006 | Aingaran et al. |
| 2007/0050771 A1* | 3/2007 | Howland ............... G06F 9/485 |
| | | 718/102 |
| 2007/0074219 A1* | 3/2007 | Ginsberg ............. G06F 1/3203 |
| | | 718/102 |
| 2008/0013450 A1 | 1/2008 | Worley et al. |
| 2009/0217276 A1 | 8/2009 | Brenner et al. |
| 2009/0320030 A1 | 12/2009 | Ogasawara |
| 2010/0138841 A1 | 6/2010 | Dice et al. |
| 2011/0023040 A1* | 1/2011 | Hendry ............... G06F 9/3879 |
| | | 718/102 |
| 2011/0145616 A1* | 6/2011 | Rychlik ............... G06F 9/5027 |
| | | 713/323 |

\* cited by examiner

PROCESSOR MANAGEMENT VIA THREAD STATUS

BACKGROUND

The present invention relates to processors, and more specifically to processor management.

Advanced processors can typically handle a number of threads (e.g., four), which may be subparts of a software process. The threads are usually executed in a time-division multiplex manner by the processor and may share the same memory (e.g., registers) on the processor or have memory assigned to them (e.g., particular registers). During execution, a software thread may issue a data request (e.g., to a data source). The software thread may then poll to check whether the data request has been fulfilled.

BRIEF SUMMARY

In one implementation, a process for managing a processor may include activating a delay thread running on the processor. A determination is made whether a wait event for a first thread running on the processor is in a queue. Responsive to determining that the wait event for the first thread is in the queue, a determination is made whether a wait time associated with the wait event has expired. Responsive to determining that the wait time has not expired, a determination is made if wait time exceeds a threshold. Responsive to determining that the wait time exceeds the threshold, a timer is set and a low power mode is initiated for the processor.

The details and features of various implementations will be conveyed by the following description, along with the drawings.

DETAILED DESCRIPTION

Processors may be managed via their thread status by a variety of techniques. In certain implementations, for example, when it is determined that a thread is pausing for a short period of time (e.g., when the thread is issuing a data request), the thread may be designated as a paused thread (e.g., by placing a wait event for the thread in a queue) so that the thread will not be considered as being ready to run. Additionally, a delay thread may be activated. The delay thread may run at a low priority and determine, among other things, whether a wait time associated with the pause has expired. The delay thread may, for example, provide a better indication regarding a processor's resources and allow a lower power mode to be entered for the processor. Once the wait time has expired, the first thread may be considered as being ready to run.

A single-core processor with a single hardware thread is used in illustrating the following systems, processes, and techniques. However, current microprocessor chips, also known as processors, can include multiple cores, which can each include multiple hardware threads. The described systems, processes, and techniques may also be able to operate in a multiple core and/or a multiple hardware thread environment.

As will be appreciated by one skilled in the art, aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be a tangible medium that can contain or store a program for use by or in connection with an instruction execution system, apparatus, or device.

A computer readable signal medium may include a propagated data signal with computer readable program code embodied therein, for example in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any medium, including but not limited to wireless, wireline, optical fiber cable, RF, etc. or any suitable combination of the foregoing.

Computer program code for carrying out operations for aspects of the disclosure may be written in any combination of one or more programming languages such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), or a wireless network (e.g., Wi-Fi or cellular), or the connection may be made to an external computer (for example, through the Internet using an Internet Service Provider).

Aspects of the disclosure are described below with reference to flowchart illustrations and/or block diagrams of methods, apparatus (systems), and computer program products according to implementations. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

Figure 1:
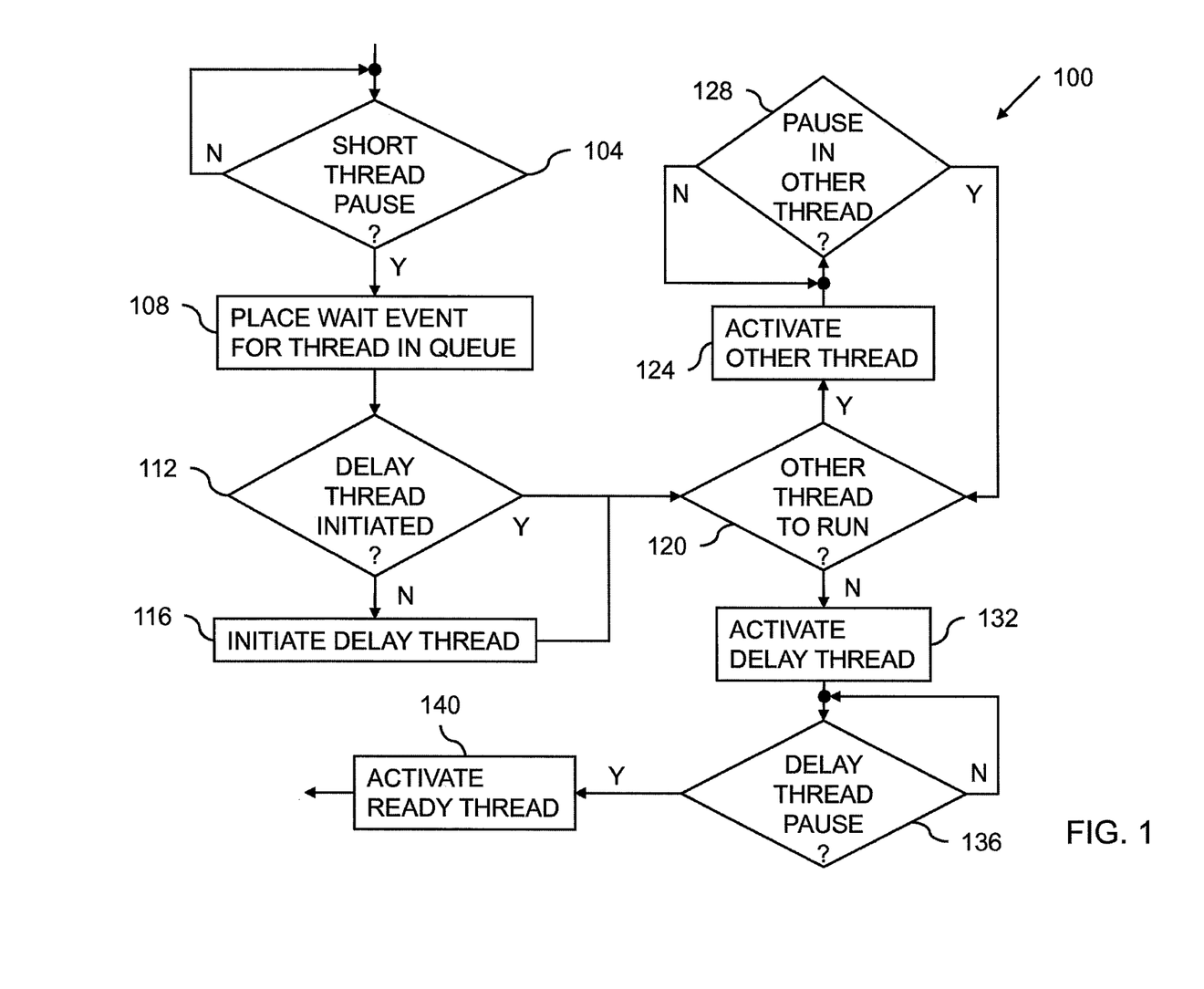
FIG. 1 is a flowchart illustrating an example process for managing a processor via thread status.

FIG. 1 is a flowchart illustrating an example process 100 for managing a processor via thread status. Process 100 may, for example, be implemented by a computer system of which the processor is a component. In particular implementations, process 100 may be implemented by an operating system.

Process 100 calls for determining whether a thread has paused for a short period of time (operation 104). During operation, threads may pause for a variety of reasons, such as when they are waiting for a data request to be fulfilled (e.g., data from another thread or an operation by a remote resource), and the threads may provide a notification of their status by posting an update (e.g., to the operating system). The pauses may be of varying length. A short thread pause is typically less than 100 microseconds, and for some implementations, it may be less than 20 microseconds. If a short thread pause is occurring, process 100 calls for continuing to wait for such a thread pause.

Once a thread is pausing for a short period of time, process 100 calls for placing a wait event for the thread in a queue (operation 108). The wait event placement may, for example, be accomplished by placing a wait time for the thread in a queue for waiting threads. In particular implementations, the thread may also be placed in a queue, which may be ordered based on wait time.

Process 100 also calls for determining whether a delay thread has been initiated (operation 112). A delay thread may, for example, be used to address threads that have been designated as paused. If a delay thread has not been initiated, process 100 calls for initiating the delay thread (operation 116).

Once a delay thread has been initiated, process 100 calls for determining whether there is another thread ready to run (operation 120). Another thread may be ready to run, for instance, if it was previously ready but of a lower priority than the pausing thread. If there is another thread ready to run, process 100 calls for activating (e.g., dispatching) the other thread (operation 124). The other thread may then run according to its own logic.

Process 100 also calls for determining whether a pause has occurred in the other thread (operation 128). If no pause has occurred, process 100 calls for waiting for a pause to occur. Once a pause occurs, process 100 calls for again determining whether there is another thread ready to run (operation 120).

If there is not another thread ready to run, process 100 calls for activating the delay thread (operation 132), which may then run according to its own logic, an example of which will be discussed below. The delay thread may run at a priority close to or just above that of an idle loop. Process 100 also calls for determining whether a pause has occurred in the delay thread (operation 136). A pause in the delay thread may, for example, occur because the delay thread is complete or it is time for the waiting thread to become active. Once a pause has occurred in the delay thread, process 100 calls for activating a thread that is ready to run (operation 140). A thread that is ready may, for example, be the thread that originally paused.

Figure 2:
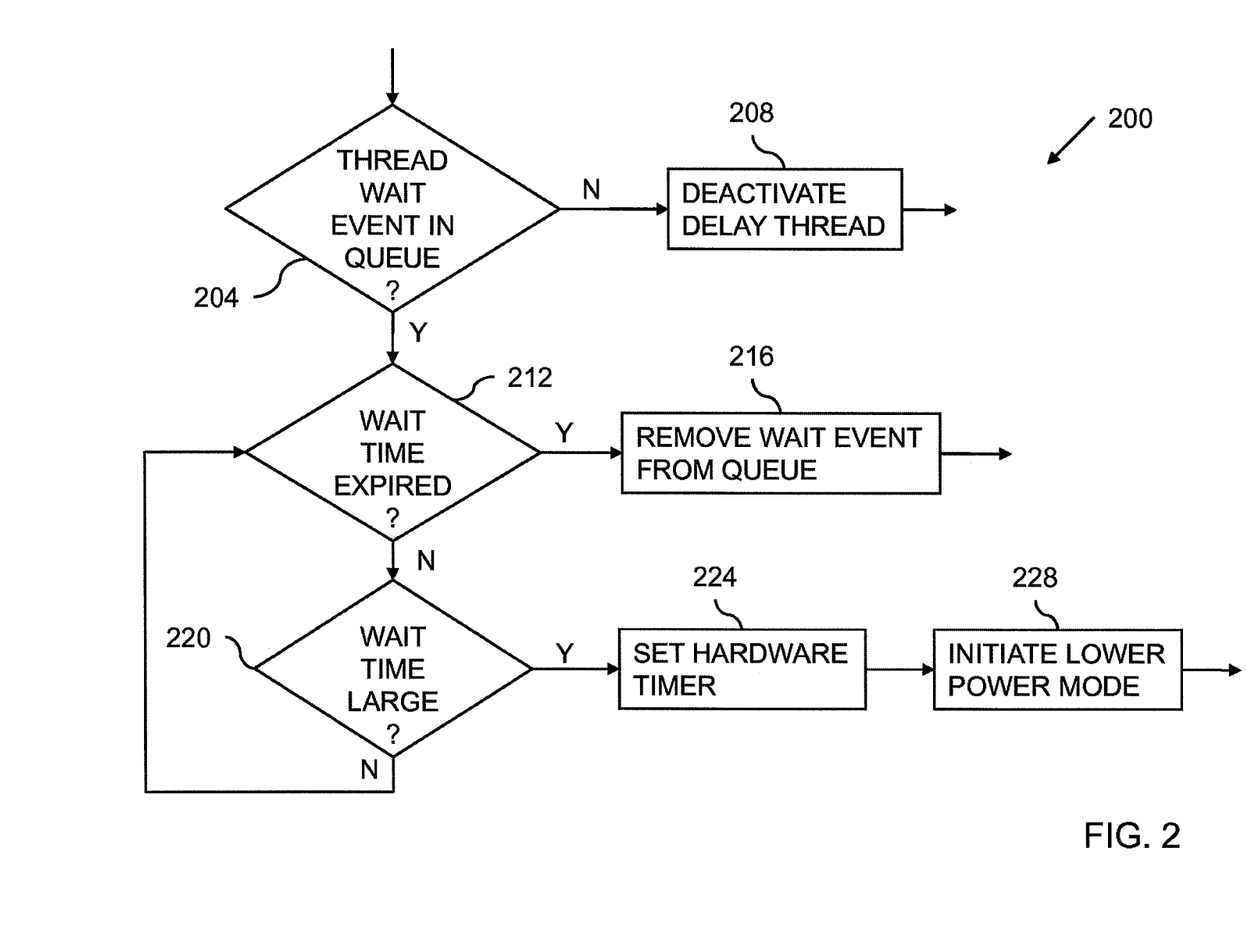
FIG. 2 is a flowchart illustrating another example process for managing a processor via thread status.

FIG. 2 is a flowchart illustrating another example process 200 for managing a processor via thread status. In particular, process 200 may be delay thread implemented by an operating system. Process 200 may, for example, be implemented by a computer system of which the processor is a component.

Process 200 calls for determining whether a wait event for a thread is in a queue (operation 204). A wait event may, for example, have an associated wait time and have been placed in a queue by a previous process. If a wait event for a thread is not in the queue, process 200 calls for deactivating the delay thread (operating 208).

If, however, a wait event for a thread is in the queue, process 200 calls for determining whether an associated wait time has expired (operation 212). If the wait time has expired, process 200 calls for removing the wait event from the queue (operation 216). In particular implementations, this may also entail removing the associated thread from a queue and placing it in a regular thread queue. The associated thread may then be activated (e.g., by the operating system).

If the wait time has not expired, process 200 calls for determining whether the wait time is large (operation 220). A wait time may be large, for example, if it is longer than 100 microseconds. If the wait time is large, process 200 calls for setting a hardware timer (operation 224) and initiating a lower power mode for an associated processor (operation 228).

If, however, the wait time is not large, process 200 calls for looping until the wait time has expired at operation 212. This loop may be performed with a priority that is near or just above the idle loop priority.

Process 100 and process 200 may provide a variety of features. For example, by allowing a thread above an idle thread's priority to be run, the processor time available for performing actual operations may be more accurately determined. For instance, the processor utilization in performing the loop may be credited to idle processor time as opposed to busy time.

Moreover, in certain implementations, it may be possible to enter a lower power mode while running the delay thread, which can conserve power. While an operating system's idle thread may eventually lead to a lower power mode, it typically takes a long time to enter this mode and a long time to exit the mode, and in at least some implementations, processes 100, 200 are usable with operation response times on the order of a few microseconds.

As another example, the operations could be implemented by modifications to an operating system's idle thread. As opposed to typical idle thread operations, however, the conditions for entering a lower power mode are already satisfied. Thus, a lower power mode may be entered soon (e.g., within a few microseconds) after the idle thread activates. Moreover, at least one set of conditions for exiting the idle thread (i.e., exceeding the stored wait time) is known. Thus, the idle thread's typical operations could be altered to provide an exit when the stored wait time expires. The time spent executing this portion of the idle thread may be accounted for differently than the idle accounting.

In particular implementations, the processes may be undertaken for several threads contemporaneously. Thus, there could be multiple threads simultaneously paused. These threads could, for example, be placed in a queue of paused threads. The threads could, for instance, be ordered based on when they will be ready to run. When this queue is populated and there are no other threads to run beginning an idle thread and/or entering the lower power mode may be appropriate.

Figure 3A:
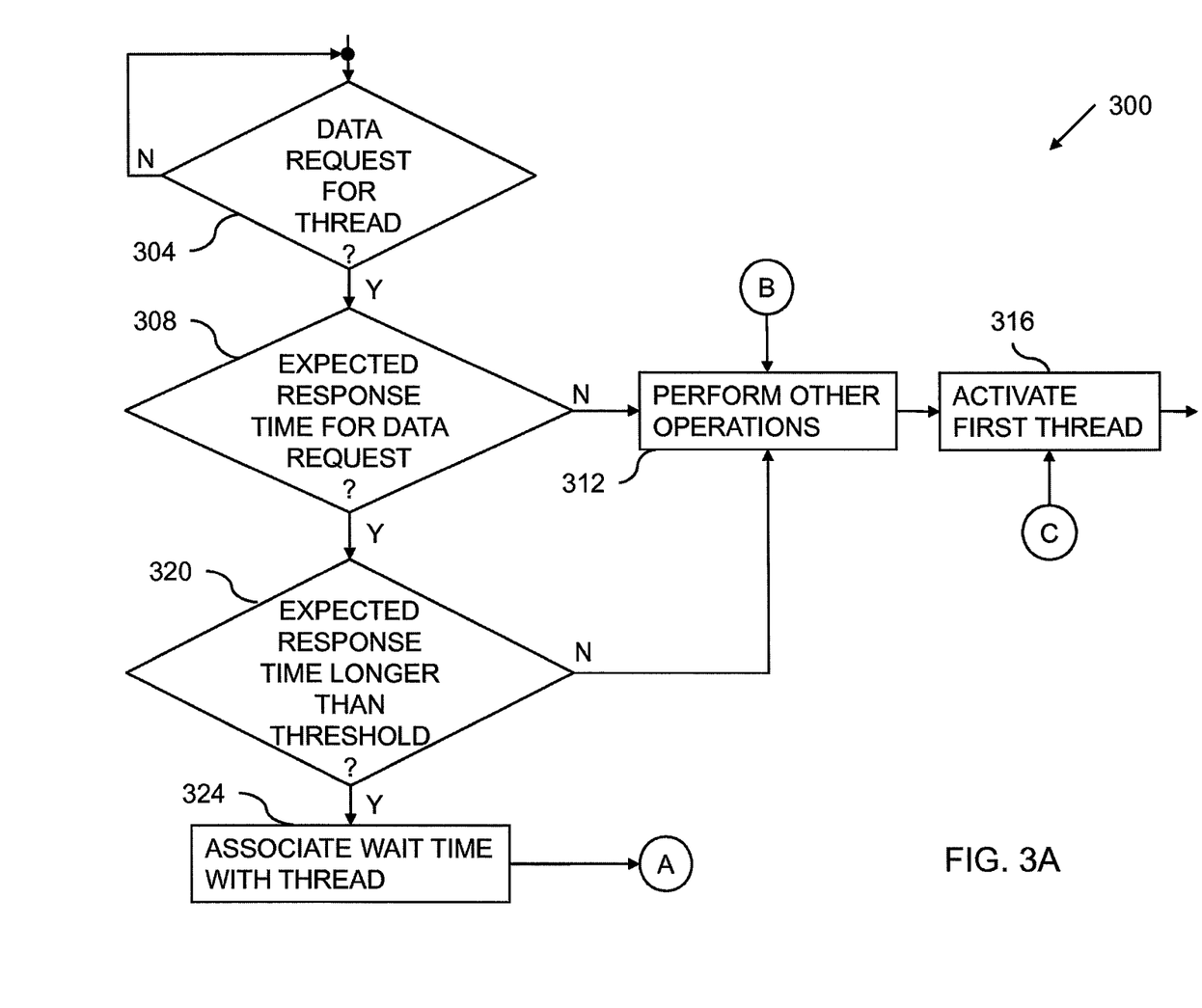
FIGS. 3A-B are a flowchart illustrating an additional example process for managing a processor via thread status.
Figure 3B:
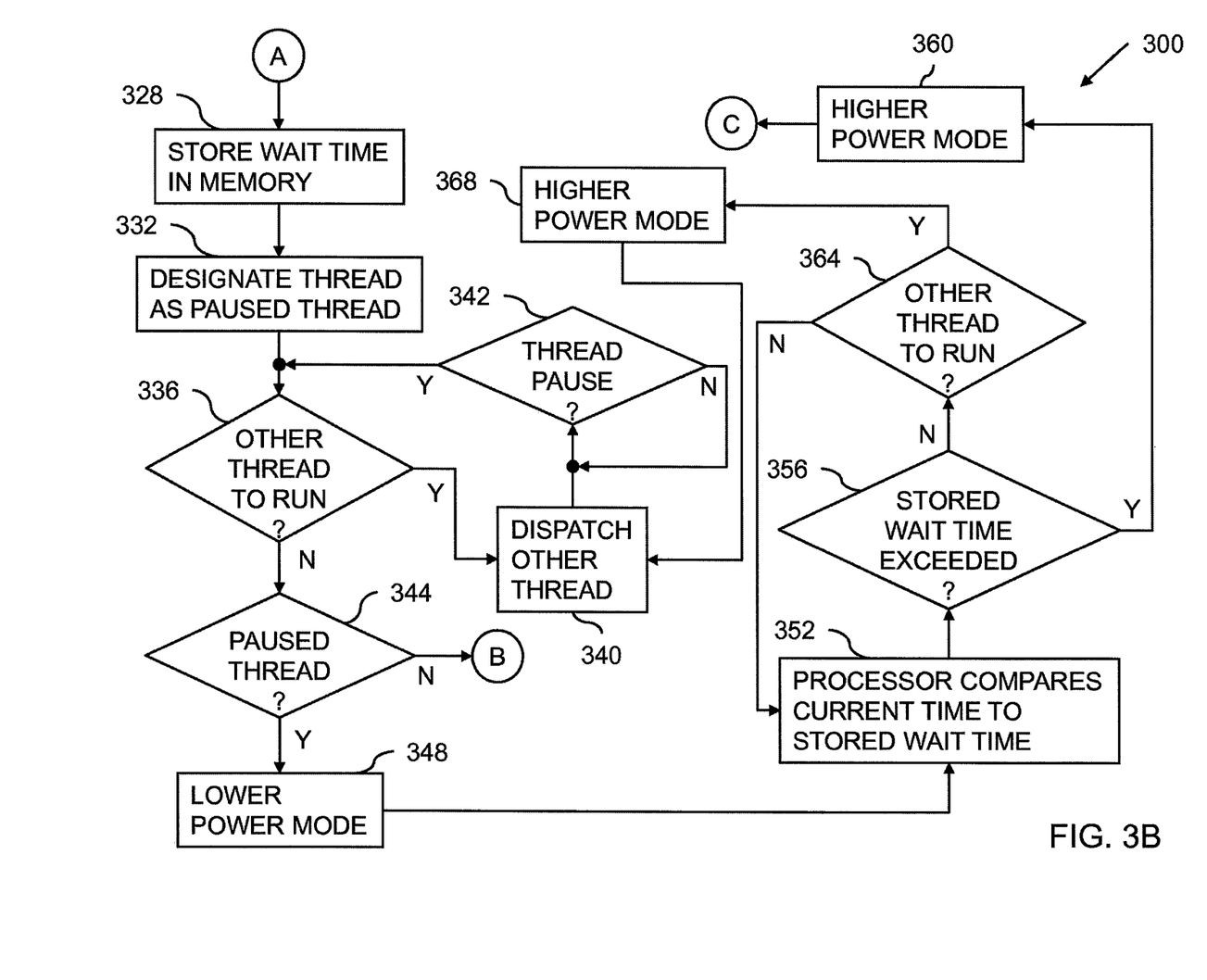

FIGS. 3A-B illustrate an additional example process 300 for managing a processor via thread status. Process 300 may, for example, be implemented by a computer system of which the processor is a component.

Process 300 calls for determining whether there is a data request for a first thread (operation 304). A data request may, for example, be regarding data from a remote computer system (e.g., a request to retrieve data from a database or a lock request to a lock management appliance). Remote computer systems may, for instance, be connected through an Ethernet connection, a high-speed network fabric (e.g., Infiniband), or any other appropriate communication network. Such a data request may be handled through a TCP/IP transfer, remote direct memory access, or any other appropriate protocol. The data request may also be to part of a local computer system (e.g., threads in the same processor exchanging data through memory). The data request may be about to be issued, be being issued, or have been previously issued. If there is no data request for a thread, process 300 calls for continuing to wait for a data request.

If there is a data request for a thread, process 300 calls for determining an expected response time for the data request (operation 308). The expected response time may, for example, be based on previous data request/response scenarios for the thread and/or for other threads. A remote direct memory access may, for example, take on the order of a few microseconds (e.g., 3-12), which is typically a long time for processors, as they may, for example, context switch software threads in less than 1 microsecond (e.g., 0.5 microseconds). In general, process 300 may be used with any low latency event model.

If there is no expected response time for the data request, process 300 calls for performing other operations (operation 312). For example, another thread could be activated or an idle thread could be run. Once the other operations have been performed, the first thread may be activated (operation 316).

If, however, there is an expected response time for the data request, process 300 calls for determining whether the expected response time is longer than a threshold (operation 320). The threshold may, for example, be preset based on processor capabilities (e.g., time to switch between threads and processing rate) or calculated dynamically (e.g., based on current processor load). For instance, if the expected response time is close to the time for the processor to switch between threads (e.g., within a few microseconds), it may be inefficient to switch threads. If the expected response time is not longer than the threshold, process 300 again calls for performing other operations (operation 312).

If, however, there is an expected response time for the first thread's data request and that time is longer than the threshold, process 300 calls for associating a wait time with the first thread (operation 324). The wait time may, for example, be the current time plus the expected response time. Process 300 also calls for storing the wait time in memory (operation 328). The wait time may, for instance, be placed in a status table for the first thread or a pointer to the storage location may be used.

Process 300 additionally calls for designating the thread as a paused thread (operation 332). The thread may, for example, be designated as a paused thread by placing it in a queue for paused threads and/or associating an appropriate indicator with the thread.

Process 300 also calls for determining whether there is another thread that is ready to run (operation 336). If there is another thread that is ready to run, process 300 calls for dispatching the other thread (operation 340).

Process 300 also calls for checking whether the other thread has paused (operation 342). If the other thread has not paused, process 300 calls for waiting for the other thread to pause. Once the other thread pauses, process 300 calls for again determining whether there is a thread ready to run (operation 336). This thread may have been ready to run when the other thread was selected to run (e.g., perhaps being passed over because its priority was not as high as the other thread) or have become ready while the other thread was running. If there is a thread ready to run, process 300 calls for dispatching that thread (operation 340). Process 300 may continue to check for and dispatch other threads for a number of intervals.

If there is not another thread that is ready to run, however, process 300 calls for determining whether there is a thread waiting for a data response (operation 344). Determining whether there is a thread waiting for a data response may, for instance, be performed by examining queued threads (e.g., to see if any have an associated waiting time) or by examining a queue of waiting threads to if any threads are present. If there is not a thread waiting for a response, process 300 calls for performing other operations (operation 312).

If, however, there is a thread waiting for a data response, process 300 calls for placing the processor into a lower power mode (operation 348). The processor may, for example, be placed into the lower power mode by an operating system slowing the processor's clock and/or instruction rate. For example, the processor may implement a thread that has a very low priority.

While the processor is in the lower power mode, process 300 calls for the processor to compare the current time (e.g., system time or elapsed time since the data request) with the stored wait time (operation 352) and determining whether the stored wait time for the first thread has been exceeded (operation 356). The determination may, for example, be performed by determining whether the current system time is later than the data request time plus the expected response time, which may be expressed as a single time (e.g., data request time plus expected response time). If the wait time has been exceeded, process 300 calls for placing the processor in a higher power mode (operation 360) and activating the first thread (operation 316). If the stored wait time has not been exceeded, process 300 calls for determining whether there is another thread ready to run (operation 364). Another thread may, for example, be ready to run if it became ready during the lower power mode.

If there is not another thread ready to run, process 300 calls for again comparing the current time to the stored wait time (operation 352). If, however, there is another thread ready to run, process 300 calls for placing the processor in a higher power mode (operation 368) and dispatching the other thread (operation 340).

Process 300 has a variety of features. For example, by being able to place a processor into a lower power mode when no threads are ready to run and there is sufficient time, power may be conserved and unnecessary mode conversions may be avoided. Moreover, process 300 provides the ability to implement the timing without having to take an interrupt upon data response receipt and/or setting hardware timers, which may be costly to implement and take a long time to execute, especially for sub-millisecond resolution. Additionally, by being able to relinquish the processor, process 300 allows other threads to be able to be run, which increases processor utilization. Furthermore, a waiting thread may not count as "runnable" from the perspective of utilization tools (e.g., run queue length in virtual memory statistics), which may provide increased accuracy in computed utilization because the wait time (i.e., the time when the process could run something if available) could be credited to idle time in processor utilization, helping to provide a better understanding of the potential capacity of the system.

Although FIG. 3 illustrates a process for managing a processor via thread status, other processes for managing a processor via thread status may include fewer, additional, and/or a different arrangement of operations. For example, a process may call for determining how much time is left until the wait time is exceeded before allowing another thread to run or placing a processor in a lower power mode. As another example, operation 352 and operation 364 could be performed in opposite order, operation 324, operation 328, and operation 332 could be performed in any order, and operation 336 could be performed at different points in the process. As a further example, operation 332 may be subsumed by operation 328.

The process of entering the lower power mode (operation 348), comparing the current time to the stored wait time (operation 352) checking whether the stored wait time has been exceeded (operation 356), returning to a higher power mode if the stored wait time has been exceeded (operation 360), and checking whether there is another thread to run if the stored wait time has not been exceeded (operation 364) may be accomplished by a variety of techniques. For example, before or after entering the lower power mode, a new thread class cued to a timer could be activated. This thread class may, for instance, be of a type that can be executed efficiently while in the lower power mode (e.g., a tight loop). This thread may execute during the lower power mode until the stored wait time is exceeded or another thread becomes ready to run.

Figure 4:
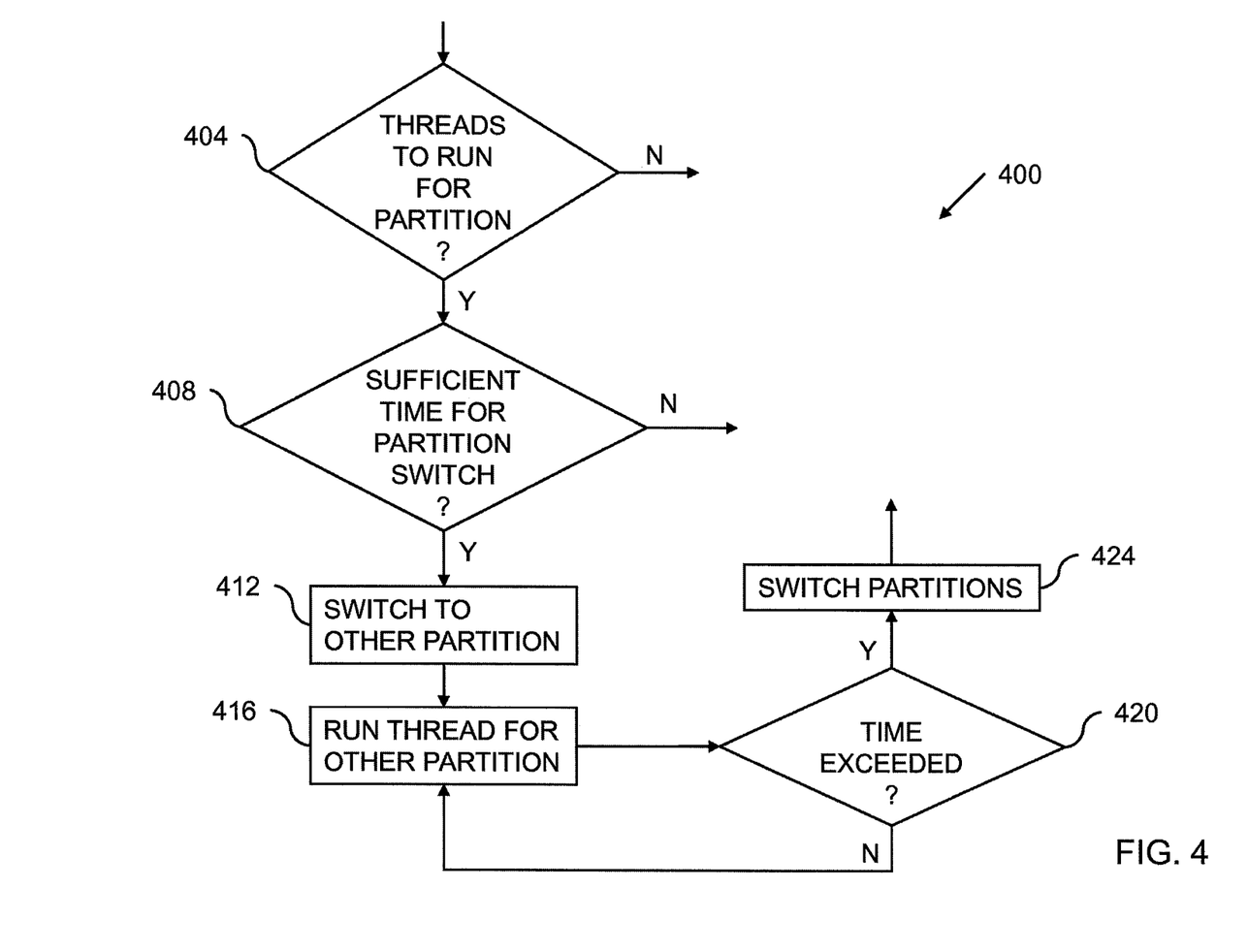
FIG. 4 is a flowchart illustrating another example process for managing a processor via thread status.

FIG. 4 is a flowchart illustrating another example process 400 for managing a processor via thread status. In general, process 400 is applicable to a processor that has operational partitions. Process 400 may, for example, be implemented by a computer system of which the processor is a component. In certain implementations, process 400 may be used in conjunction with the other example processes.

Process 400 calls for determining whether a first partition has no threads ready to run (operation 404). A thread may be initiated but not ready to run, for example, if it is has a wait time associated with it. In implementation, each partition may include a paused thread list, which may, for example, be sorted based on the times at which the paused threads will become active. If the first partition has threads ready to run, process 400 is at an end.

If, however, a first partition has no threads ready to run, process 400 calls for determining whether there is sufficient time for switching partitions for the processor (operation 408). For instance, even though a first partition may have no threads ready to run, there may be one or more paused threads that have a time at which they will be ready to run. This time may be used to determine whether there is sufficient time to perform a partition switch.

If there is not sufficient time for a partition switch, process 400 is at an end. If, however, there is sufficient time, process 400 calls for switching to another partition for the processor (operation 412). This may, for example, be accomplished by ceding control to a partition switching program (e.g., a hypervisor, available from companies such as International Business Machines Corp. of Armonk, N.Y., Microsoft Corp. of Redmond, Wash., and Hewlett-Packard Co. of Palo Alto, Calif.).

Process 400 also calls for running a thread in the other partition (operation 416) and checking whether the time for the partition switch has been exceeded (operation 420). The time may, for example, be based on the wait time for a thread in the first partition. If the time has not been exceeded, process 400 calls for running another thread in the other partition (operation 416).

Once the time has been exceeded, process 400 calls for switching back to the first partition (operation 424). The thread(s) in this partition may then be run, and process 400 is at an end.

As illustrated, process 400 allows a processor to switch partitions when there are no threads ready to run on a first partition and there is sufficient time for making the switch. Thus, process 400 can facilitate strategic increased utilization for partitioned processors.

The flowchart and block diagrams in the figures illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems the perform the specified function or acts, or combinations of special purpose hardware and computer instructions.

Figure 5:
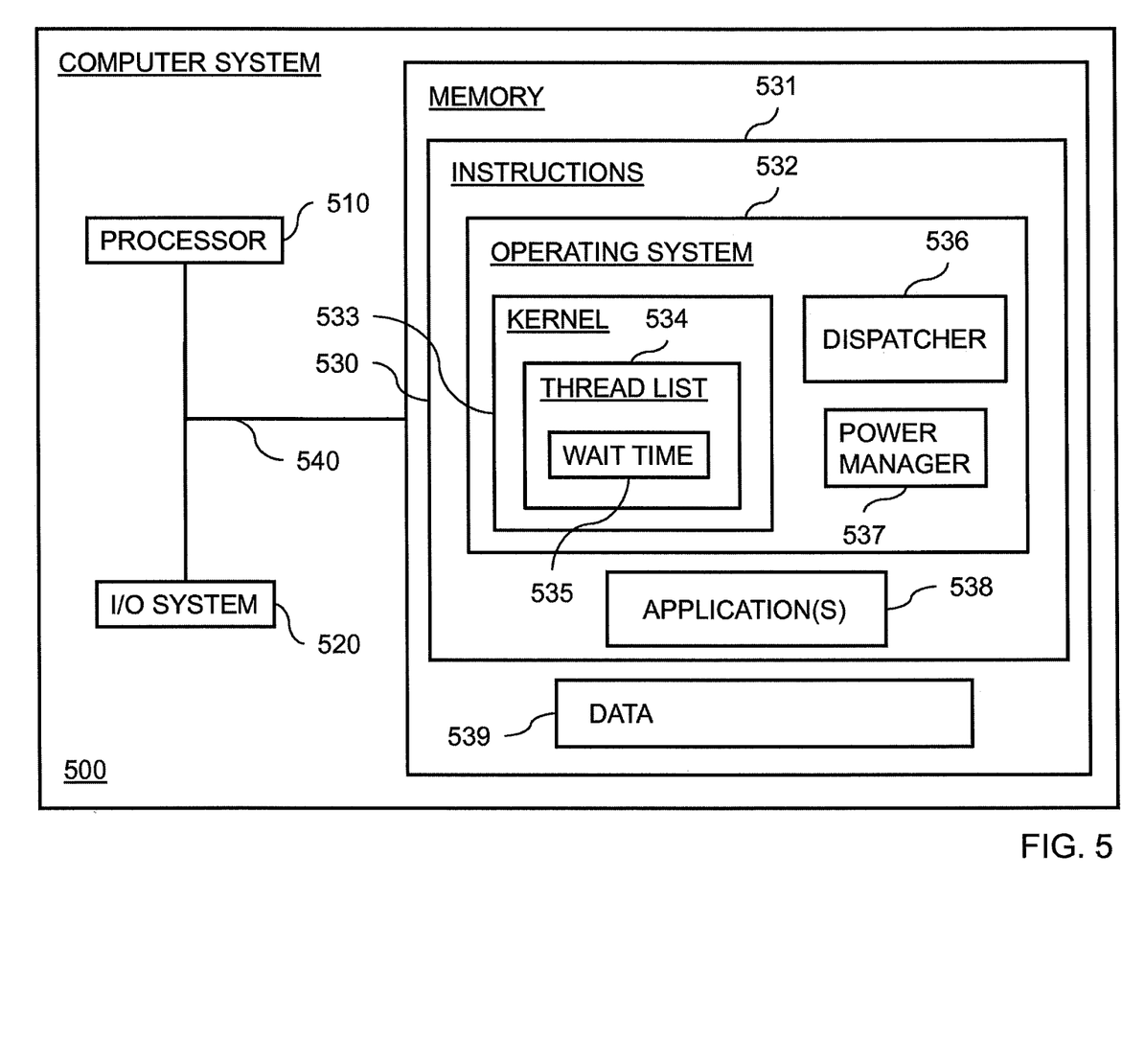
FIG. 5 is a block diagram illustrating an example computer system for which a processor may be managed via thread status.

FIG. 5 illustrates an example computer system 500 in which a processor may be managed via thread status. System 500 includes a processor 510, an input/output system 520, and memory 530, which are coupled together by a network 540.

Processor 510 typically includes a logical processing unit (e.g., an arithmetic logic unit) that processes data under the direction of program instructions (e.g., from software). For example, processor 510 may a microprocessor, a microcontroller, or an application specific integrated circuit, which may operate by reduced instruction set computer (RISC) or complex instruction set computer (CISC) principles. Processor 510 may also be capable of simultaneously executing multiple independent hardware threads for execution. In general, the processor may be any device that manipulates data in a logical manner.

Input/output system 520 may, for example, include one or more communication interfaces and/or one or more user interfaces. A communication interface may, for instance, be a network interface card (whether wireless or wireless) or a modem. A user interface could, for instance, be a user input device (e.g., a keyboard, a keypad, a touchpad, a stylus, or a microphone) or a user output device (e.g., a monitor, a display, or a speaker). In general, system 520 may be any combination of devices by which a computer system can receive and output data.

Memory 530 may, for example, include random access memory (RAM), read-only memory (ROM), and/or disc memory. Various items may be stored in different portions of the memory at various times. Memory 530, in general, may be any combination of devices for storing data.

Memory 530 includes instructions 531 and data 539. Instructions 531 include an operating system 532 (e.g., Windows, Linux, or Unix) and applications 538 (e.g., word processing, spreadsheet, drawing, scientific, etc.). Data 539 includes the data required for and/or produced by applications 534.

Operating system 532 includes a kernel 533, a dispatcher 536, and a power manager 537. Kernel 533 typically provides a bridge between applications and the actual data processing performed at the hardware level, and its responsibilities include managing the computer system's resources (e.g., the communication between hardware and software components). Kernel 533 includes a thread list 534 (e.g., a table), which identifies the threads that have been initiated by computer system 500. One or more of the threads on list 574 may be currently running, ready to run, and/or paused.

Dispatcher 536 is responsible for activating the threads. For example, once operating system 532 becomes aware that a thread is pausing (e.g., by receiving a yield call), dispatcher 536 may analyze thread list 534 to determine another thread to activate. The threads may, for example, be activated in a prioritized manner. If no threads are present, dispatcher 536 may run an idle thread.

Thread list 534 contains a wait time 535, which may be associated with one or more threads. Wait time 535 may indicate the time (e.g., physical time, processor cycles, or other appropriate measure) after which a thread may be made active (e.g., the data request time plus the expected response time). The wait time may be of relatively high resolution (e.g., a few microseconds).

Dispatcher 536 may consider the wait time in determining whether to run a thread. For example, if a thread that is otherwise ready to be activated has an associated wait time that has not been exceeded, dispatcher 536 may not activate the thread. When a thread is associated with a wait time, the thread could, for example, be placed at the end of thread list 534. Dispatcher 536 may then consider threads of the next priority level.

In certain implementations, a thread with an associated wait time may be placed on a list for waiting threads, which could, for example, be ordered based on the wait times. Dispatcher 536 may check this list periodically to see whether any threads are eligible to become active and move any appropriate threads to the regular thread list. In particular implementations, dispatcher 536 may select the thread on the wait list that has the earliest ready time if it has the best priority. This could result in some inversion of thread priority, however, but that should not be problematic for low processor utilizations.

Power manager 537 is responsible for placing processor 510 in different power management states (e.g., full power, standby, and sleep). Power manager 537 may operate in conjunction with dispatcher 536. For example, when dispatcher 536 determines that there are no threads ready to run, power manager 537 may place processor 510 in a lower power mode. In the lower power mode, the processor may, for example, operate at a reduced clock and/or instructions rate.

Network 540 is responsible for communicating data between processor 510, input/output system 520, and memory 530. Network 540 may, for example, include a number of different types of busses (e.g., serial and parallel).

The terminology used herein is for the purpose of describing particular implementations only and is not intended to be limiting. As used herein, the singular form "a", "an", and "the" are intended to include the plural forms as well, unless the context clearly indicates otherwise. It will be further understood that the terms "comprises" and/or "comprising," when used in the this specification, specify the presence of stated features, integers, steps, operations, elements, and/or components, but do not preclude the presence or addition of one or more other features, integers, steps, operations, elements, components, and/or groups therefore.

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. Many modifications and variations will be apparent to those of ordinary skill in the art without departing from the scope and spirit of the disclosure. The implementations were chosen and described in order to explain the principles of the disclosure and the practical application and to enable others or ordinary skill in the art to understand the disclosure for various implementations with various modifications as are suited to the particular use contemplated.

A number of implementations have been described for processor management via thread status, and several others have been mentioned or suggested. Moreover, those skilled in the art will readily recognize that a variety of additions, deletions, modifications, and substitutions may be made to these implementations while still achieving process management via thread status. Thus, the scope of the protected subject matter should be judged based on the following claims, which may capture one or more aspects of one or more implementations.

The invention claimed is:

1. A method implemented by a computer, the method comprising:

determining whether a wait event for a first thread running on a processor is in a queue;

responsive to determining that the wait event for the first thread is in the queue, activating a delay thread; and responsive to determining that the wait event for the first thread is in the queue, the delay thread:

determining whether a wait time associated with the wait event has expired;

responsive to determining that the wait time has not expired, determining if the wait time exceeds a threshold; and responsive to determining that the wait time exceeds the threshold:

setting a timer; and initiating a low power mode for the processor in accordance with the timer.

2. The method of claim 1, further comprising:

responsive to determining that the wait event is not in the queue, deactivating the delay thread.

3. The method of claim 1, further comprising, responsive to determining that the wait time has expired, removing the wait event from the queue.

4. The method of claim 3, further comprising removing the first thread from another queue ordered based on wait times.

5. The method of claim 1, further comprising, responsive to determining that the wait time does not exceed the threshold, initiating a loop until the wait time expires.

6. A computer program product for managing a processor, the computer program product comprising:

a non-transitory computer readable medium having computer readable program code embodied therewith, the computer readable program code configured to:

determine whether a wait event for a first thread running on a processor is in a queue;

responsive to determining that the wait event for the first thread is in the queue, activating a delay thread; and responsive to determining that the wait event for the first thread is in the queue, the delay thread:

determining whether a wait time associated with the wait event has expired;

responsive to determining that the wait time has not expired, determining if the wait time exceeds a threshold; and responsive to determining that the wait time exceeds the threshold:

setting a timer; and initiating a low power mode for the processor in accordance with the timer.

7. The computer program product of claim 6, wherein the computer readable program code is configured to, responsive to determining that the wait event is not in the queue, deactivate the delay thread.

8. The computer program product of claim 6, wherein the computer readable program code is configured to, responsive to determining that the wait time has expired, remove the wait event from the queue.

9. The computer program product of claim 8, wherein the computer readable program code is configured to remove the first thread from another queue ordered based on wait times.

10. The computer program product of claim 6, wherein the computer readable program code is configured to, responsive to determining that the wait time does not exceed the threshold, initiate a loop until the wait time expires.

11. A system, comprising:

a processor; and a memory storing code executable by the processor to:

determine an expected response time for a data request issued for a first thread running on the processor based on previous data requests issued by other threads;

associate a wait time with the first thread based on the expected response time being longer than a threshold;

store the wait time in a computer readable storage medium;

determine whether another thread is ready to run;

place the processor in a lower power mode based on there being no other thread ready to run;

compare a current time to the stored wait time with the processor;

determine whether the stored wait time has been exceeded;

place the processor in a higher power mode based on the stored wait time having been exceeded; and activate the first thread.

12. The system of claim 11, wherein the code is executable by the processor to: designate the first thread as a paused thread based on the expected response time being longer than the threshold; and place the processor in a lower power mode based on there being a paused thread.

13. The system of claim 12, wherein the code is executable by the processor to designate the first thread as a paused thread by placing the thread in a queue for waiting threads.

14. The system of claim 11, wherein the code is executable by the processor to:

determine whether to switch the processor from a first partition to a second partition based on there being no other thread ready to run;

switch the processor to the second partition based on the there being no other thread ready to run;

determine whether the wait time has been exceeded; and switch the processor from the second partition to the first partition based on the wait time having been exceeded.

15. The system of claim 14, wherein the code is executable by the processor to determine whether the wait time has been exceeded by analyzing the wait time for the first thread.

16. The system of claim 11, wherein the code is executable by the processor to place the first thread at the end of a thread table based on the expected response time being longer than the threshold.

17. The system of claim 11, wherein the code is executable by the processor to place the first thread in a thread table essentially having paused threads based on the expected response time being longer than the threshold.

* * * * *